US012534838B2

(12) United States Patent
Chong et al.

(10) Patent No.: US 12,534,838 B2
(45) Date of Patent: Jan. 27, 2026

(54) SYSTEMS AND METHODS FOR ASSESSING DRAIN PUMP PERFORMANCE IN A WASHING MACHINE APPLIANCE

(71) Applicant: Haier US Appliance Solutions, Inc., Wilmington, DE (US)

(72) Inventors: Jinmo Chong, Seoul (KR); MyungGeon Chung, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 149 days.

(21) Appl. No.: 18/354,327

(22) Filed: Jul. 18, 2023

(65) Prior Publication Data

US 2025/0027250 A1 Jan. 23, 2025

(51) Int. Cl.

| | |
|---|---|
| ***D06F 33/42*** | (2020.01) |
| ***D06F 33/47*** | (2020.01) |
| ***D06F 34/14*** | (2020.01) |
| ***G06T 7/00*** | (2017.01) |
| *D06F 105/58* | (2020.01) |

(52) U.S. Cl.

CPC .............. *D06F 33/42* (2020.02); *D06F 33/47* (2020.02); *D06F 34/14* (2020.02); *G06T 7/0002* (2013.01); *D06F 2105/58* (2020.02); *G06T 2207/30124* (2013.01)

(58) Field of Classification Search

CPC .......... D06F 33/42; D06F 33/47; D06F 33/62; D06F 33/74; D06F 34/14; D06F 39/082; D06F 39/087; D06F 2103/14; D06F 2103/18; D06F 2105/08; D06F 2105/50; D06F 2105/58; D06F 2105/60; D06F 2105/62

See application file for complete search history.

(56) References Cited

U.S. PATENT DOCUMENTS

| | | | | |
|---|---|---|---|---|
| 2007/0113595 | A1* | 5/2007 | Harwood | D06F 39/087 68/12.01 |
| 2020/0291564 | A1* | 9/2020 | O'Malley | D06F 33/42 |
| 2021/0164142 | A1 | 6/2021 | Ka et al. | |
| 2022/0178067 | A1 | 6/2022 | Yoon et al. | |
| 2022/0349102 | A1 | 11/2022 | Yun et al. | |
| 2023/0375991 | A1* | 11/2023 | Smith | G08C 23/00 |

FOREIGN PATENT DOCUMENTS

| | | |
|---|---|---|
| EP | 3495547 B1 | 8/2020 |

* cited by examiner

*Primary Examiner* — David G Cormier

(74) *Attorney, Agent, or Firm* — Dority & Manning, P.A.

(57) ABSTRACT

A washing machine appliance includes a cabinet, and a wash tub mounted within the cabinet. The washing machine appliance further includes a wash basket rotatably mounted within the wash tub. A method includes commencing an operating cycle, and sending, during the operating cycle, an activation command to a drain pump of the washing machine appliance. The method also includes obtaining one or more images of the wash tub, after sending the activation command, using a camera mounted within the cabinet. The method further includes analyzing the one or more images of the wash tub, and determining whether the drain pump is operating as expected based at least in part on the analysis of the one or more images. The drain pump operating as expected includes draining wash liquid from the wash tub at or above a minimum drain rate.

20 Claims, 7 Drawing Sheets

SYSTEMS AND METHODS FOR ASSESSING DRAIN PUMP PERFORMANCE IN A WASHING MACHINE APPLIANCE

FIELD OF THE INVENTION

The present subject matter relates generally to washing machine appliances, and more particularly to systems and methods for assessing drain pump performance in washing machine appliances.

BACKGROUND OF THE INVENTION

Washing machine appliances generally include a tub for containing wash liquid, e.g., water, detergent, bleach, and/or other additives, during operation of such washing machine appliances. A wash basket is rotatably mounted within the wash tub and defines a wash chamber for receipt of articles for washing, and an agitation element is rotatably mounted within the wash basket. Washing machine appliances are typically equipped to operate in one or more modes or cycles, such as wash, rinse, and spin cycles. For example, during a wash or rinse cycle, the wash fluid is directed into the wash tub in order to wash and/or rinse articles within the wash chamber. In addition, the wash basket and/or the agitation element can rotate at various speeds to agitate or impart motion to articles within the wash chamber, to wring wash fluid from articles within the wash chamber, etc.

Generally, drain cycles are important during a wash or rinse cycle to remove the wash fluid from the wash basket, e.g., to drain the water, detergent, and/or bleach. Thus, the drain pump is an important component in the operation of the washing machine appliance and malfunction of the drain pump can cause problems, such as flooding and/or damaging articles within the wash chamber.

Accordingly, a washing machine appliance including features and controls for drain pump performance monitoring would be useful. More specifically, washing machine appliances and methods of operating washing machine appliances that detect when a drain pump malfunctions would be particularly beneficial.

BRIEF DESCRIPTION OF THE INVENTION

Aspects and advantages of the invention will be set forth in part in the following description, or may be apparent from the description, or may be learned through practice of the invention.

In one example embodiment, a method of operating a washing machine appliance. The washing machine appliance includes a cabinet, and a wash tub mounted within the cabinet. The wash tub is configured for containing fluid during operation of the washing machine appliance. The washing machine appliance further includes a wash basket rotatably mounted within the wash tub. The wash basket defines a wash chamber configured for receiving laundry articles. The method includes commencing an operating cycle, and sending, during the operating cycle, an activation command to a drain pump of the washing machine appliance. The drain pump is configured to drain wash liquid from the wash tub. The method also includes obtaining one or more images of the wash tub, after sending the activation command, using a camera mounted within the cabinet. The camera is positioned and oriented with the wash basket within a field of vision of the camera. The method further includes analyzing the one or more images of the wash tub, and determining whether the drain pump is operating as expected based at least in part on the analysis of the one or more images. The drain pump operating as expected includes draining wash liquid from the wash tub at or above a minimum drain rate.

In another example embodiment, a washing machine appliance includes a cabinet, and a wash tub mounted within the cabinet. The wash tub is configured for containing fluid during operation of the washing machine appliance. The washing machine appliance also includes a wash basket rotatably mounted within the wash tub. The wash basket defines a wash chamber configured for receiving laundry articles. Additionally, the washing machine appliance also includes a spout configured for providing fluid to the wash tub, and a camera mounted one of on or within the cabinet. The camera is positioned and oriented with the wash basket within a field of vision of the camera. The washing machine appliance further includes a controller configured to commence an operating cycle and send, during the operating cycle, an activation command to a drain pump of the washing machine appliance. The drain pump is configured to drain wash liquid from the wash tub. The controller is also configured to obtain one or more images of the wash tub, after sending the activation command, using a camera mounted within the cabinet. The camera is positioned and oriented with the wash basket within a field of vision of the camera. The controller is further configured to analyze the one or more images of the wash tub, and determine whether the drain pump is operating as expected based at least in part on the analysis of the one or more images. The drain pump operating as expected includes draining wash liquid from the wash tub at or above a minimum drain rate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
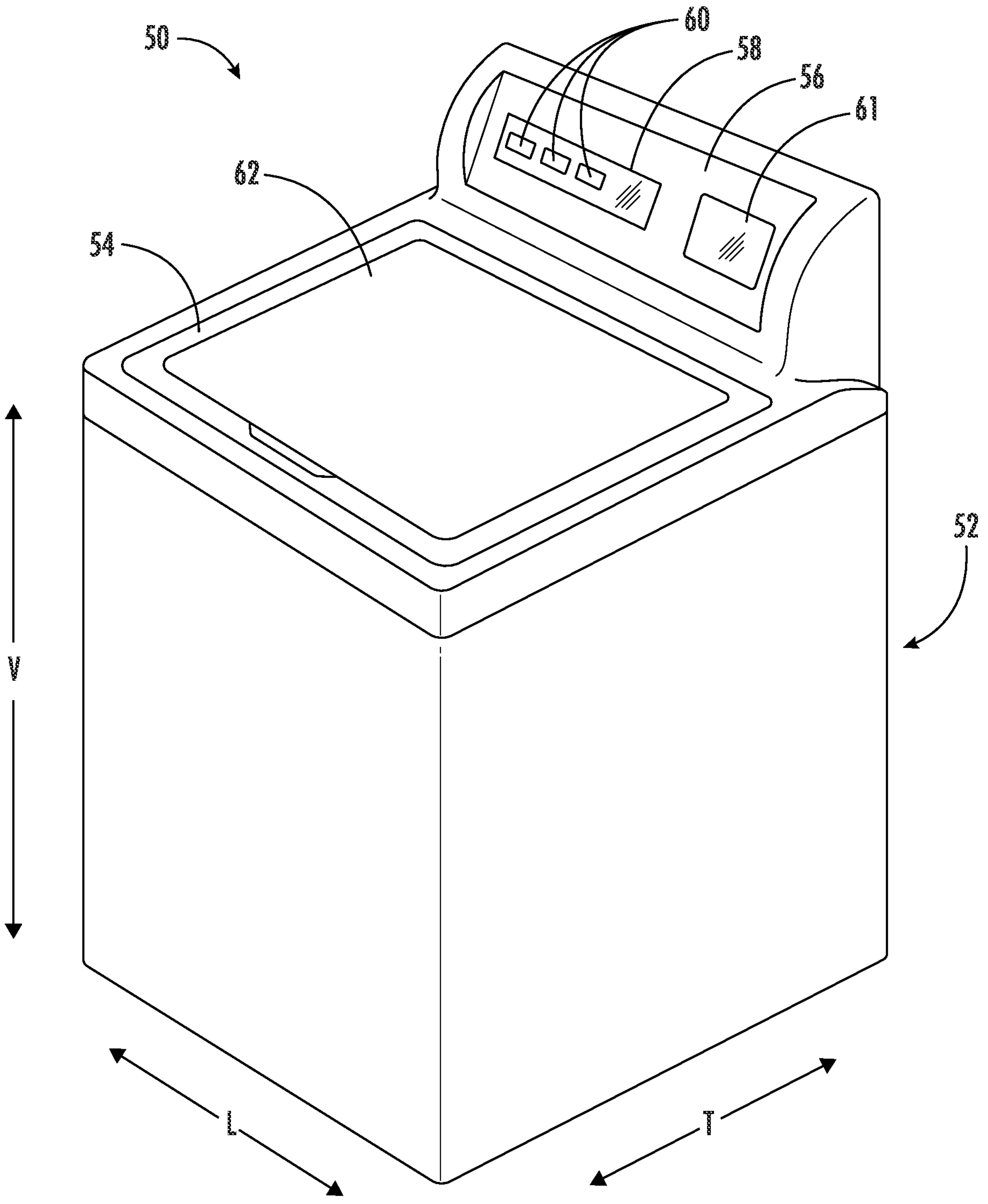
FIG. 1 provides a perspective view of a washing machine appliance according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

FIG. 1 is a perspective view of a washing machine appliance 50 according to an example embodiment of the present subject matter. As may be seen in FIG. 1, washing machine appliance 50 includes a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment, a display 61 indicates selected features, a countdown timer, and/or other items of interest to machine users. A lid 62 is mounted to cover 54 and is rotatable between an open position (not shown) facilitating access to a wash tub 64 (FIG. 2) located within cabinet 52 and a closed position (shown in FIG. 1) forming an enclosure over wash tub 64.

Figure 2:
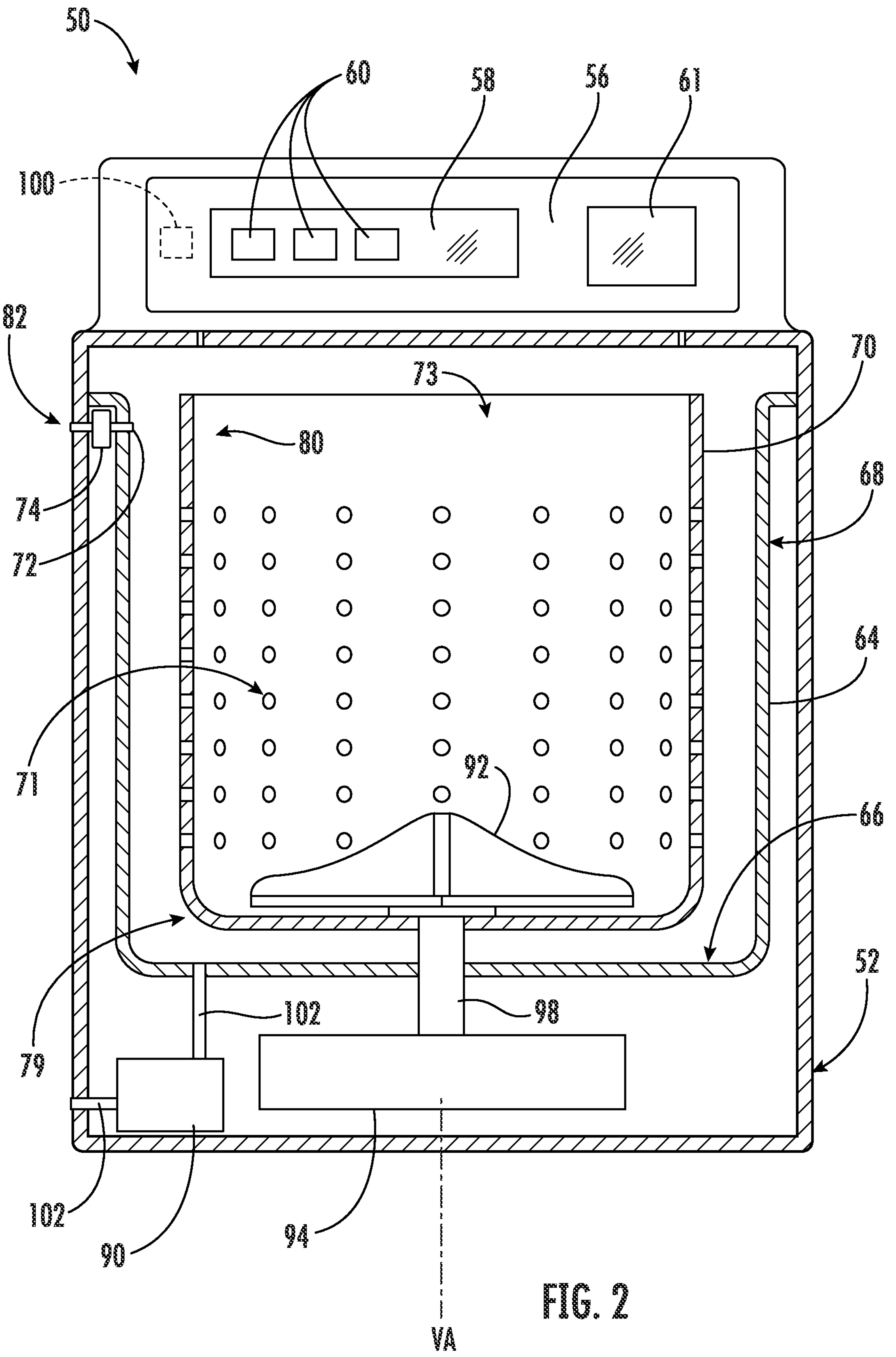
FIG. 2 provides a front, section view of the example washing machine appliance of FIG. 1.

FIG. 2 provides a front, cross-section view of washing machine appliance 50. As may be seen in FIG. 2, wash tub 64 includes a bottom wall 66 and a sidewall 68. A wash basket 70 is rotatably mounted within wash tub 64. In particular, wash basket 70 is rotatable about a vertical axis VA. Thus, washing machine appliance is generally referred to as a vertical axis washing machine appliance. Wash basket 70 defines a wash chamber 73 for receipt of articles for washing and extends, e.g., vertically, between a bottom portion 79 and a top portion 80. Wash basket 70 includes a plurality of perforations 71 therein to facilitate fluid communication between an interior of wash basket 70 and wash tub 64.

An inlet or spout 72 is configured for directing a flow of fluid into wash tub 64. The spout 72 may be a part of a fluid circulation system of the washing machine appliance, such as an inlet of the fluid circulation system. In particular, spout 72 may be positioned at or adjacent top portion 80 of wash basket 70. Spout 72 may be in fluid communication with a water supply (not shown) in order to direct fluid (e.g., clean water) into wash tub 64 and/or onto articles within wash chamber 73 of wash basket 70. A valve 74 regulates the flow of fluid through spout 72. For example, valve 74 can selectively adjust to a closed position in order to terminate or obstruct the flow of fluid through spout 72. In some embodiments, the spout 72 may be or include a drawer, such as a detergent drawer or additive drawer, through which water flows before flowing into the wash tub 64 and/or wash chamber 73. For example, in embodiments which include the drawer, the water may mix with an additive in the drawer, thereby creating wash fluid comprising water and additive dissolved therein or intermixed therewith, and wash fluid may then flow into the wash chamber 73 via the spout 72 (which may be at least partially defined by, e.g., a wall or other portion of the drawer in such embodiments) after a certain liquid volume or level within the drawer has been reached.

A pump assembly 90, e.g., a drain pump 90 (shown schematically in FIG. 2) is located beneath tub 64 and wash basket 70 for gravity assisted flow from wash tub 64. Pump 90 may be positioned along or in operative communication with a drain line 102 which provides fluid communication from the wash chamber 73 of the basket 70 to an external conduit, such as a wastewater line (not shown). In some embodiments, the pump 90 may also or instead be positioned along or in operative communication with a recirculation line (not shown) which extends back to the tub 64, e.g., in addition to the drain line 102.

An agitation element 92, shown as an impeller in FIG. 2, is disposed in wash basket 70 to impart an oscillatory motion to articles and liquid in wash chamber 73 of wash basket 70. In various example embodiments, agitation element 92 includes a single action element (i.e., oscillatory only), double action (oscillatory movement at one end, single direction rotation at the other end) or triple action (oscillatory movement plus single direction rotation at one end, single direction rotation at the other end). As illustrated in FIG. 2, agitation element 92 is oriented to rotate about vertical axis VA. Wash basket 70 and agitation element 92 are driven by a pancake motor 94. As motor output shaft 98 is rotated, wash basket 70 and agitation element 92 are operated for rotatable movement within wash tub 64, e.g., about vertical axis VA. Washing machine appliance 50 may also include a brake assembly (not shown) selectively applied or released for respectively maintaining wash basket 70 in a stationary position within wash tub 64 or for allowing wash basket 70 to spin within wash tub 64.

Operation of washing machine appliance 50 is controlled by a processing device or controller 100, that is operatively coupled to the user interface input located on washing machine backsplash 56 for user manipulation to select washing machine cycles and features. In response to user manipulation of the user interface input, controller 100 operates the various components of washing machine appliance 50 to execute selected machine cycles and features.

Controller 100 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 100 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 may be in communication with controller 100 via one or more signal lines or shared communication busses. It should be noted that controllers 100 as disclosed herein are capable of and may be operable to perform any methods and associated method steps as disclosed herein.

In an illustrative embodiment, laundry items are loaded into wash chamber 73 of wash basket 70, and washing operation is initiated through operator manipulation of control input selectors 60. Wash tub 64 is filled with water and mixed with detergent to form a wash liquid. Valve 74 can be opened to initiate a flow of water into wash tub 64 via spout 72, and wash tub 64 can be filled to the appropriate level for the amount of articles being washed. Once wash tub 64 is properly filled with wash fluid, the contents of the wash basket 70 are agitated with agitation element 92 for cleaning of laundry items in wash basket 70. More specifically, agitation element 92 may be moved back and forth in an oscillatory motion. The wash fluid may be recirculated through the washing machine appliance 50 at various points in the wash cycle, such as before or during the agitation phase (as well as one or more other portions of the wash cycle, separately or in addition to before and/or during the agitation phase).

After the agitation phase of the wash cycle is completed, wash tub 64 is drained. Laundry articles can then be rinsed by again adding fluid to wash tub 64, depending on the particulars of the cleaning cycle selected by a user, agitation element 92 may again provide agitation within wash basket 70. One or more spin cycles may also be used. In particular, a spin cycle may be applied after the wash cycle and/or after the rinse cycle in order to wring wash fluid from the articles being washed. During a spin cycle, wash basket 70 is rotated at relatively high speeds. In various embodiments, the pump 90 may be activated to drain liquid from the washing machine appliance 50 during the entire drain phase (or the entirety of each drain phase, e.g., between the wash and rinse and/or between the rinse and the spin) and may be activated during one or more portions of the spin cycle.

While described in the context of a specific embodiment of washing machine appliance 50, using the teachings disclosed herein it will be understood that washing machine appliance 50 is provided by way of example only. Other washing machine appliances having different configurations (such as horizontal-axis washing machine appliances), different appearances, and/or different features may also be utilized with the present subject matter as well.

Figure 3:
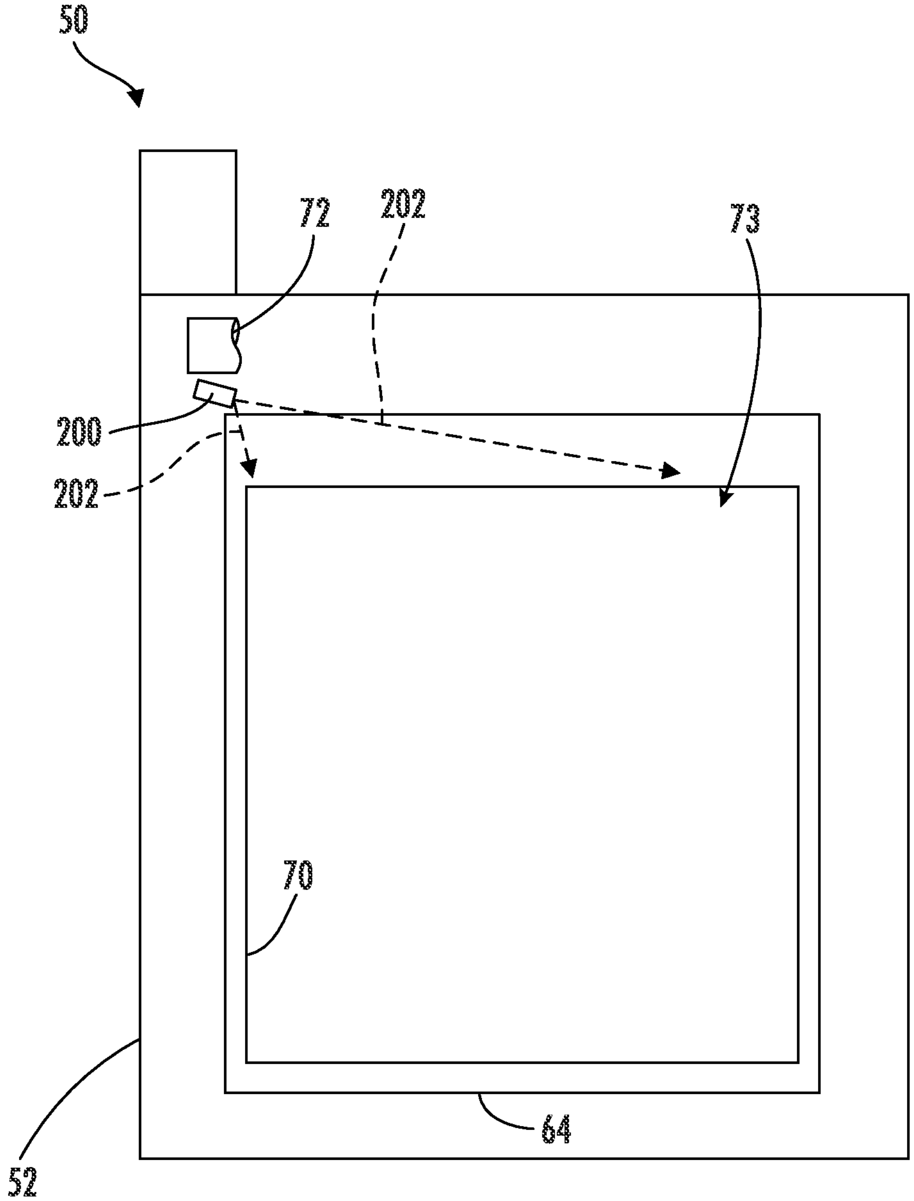
FIG. 3 illustrates a schematic side view of the example washing machine appliance of FIG. 1 according to an example embodiment of the present subject matter.
Figure 4:
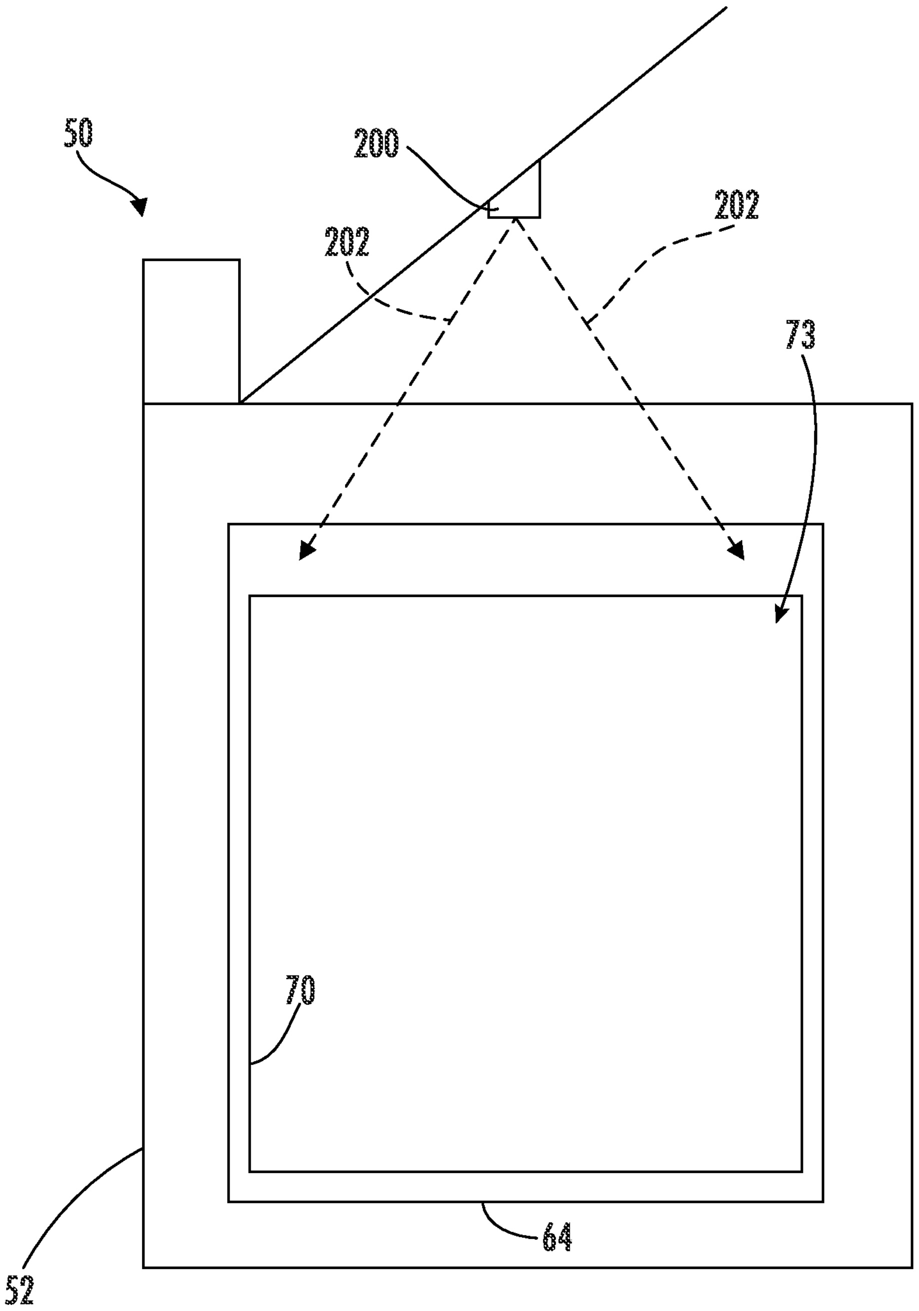
FIG. 4 illustrates a schematic side view of the example washing machine appliance of FIG. 1 according to an additional example embodiment of the present subject matter.

Referring now to FIGS. 3 and 4, washing machine appliance 50 may further include a camera 200 that is generally positioned and configured for obtaining images of wash chamber 73 and/or wash basket 70 of washing machine appliance 50. The camera 200 may be mounted within the cabinet 52, such as to the cabinet 52 itself, beneath spout 72, e.g., as illustrated in FIG. 3, or to the lid 62, e.g., as illustrated in FIG. 4. Specifically, camera 200 is mounted such that camera 200 faces toward wash chamber 73 and the wash basket 70 is within a field of vision, schematically represented by arrows 202 in FIGS. 3 and 4, of the camera 200. In this manner, camera 200 can take images or video of an inside of wash chamber 73 and remains unobstructed by windows that may obscure or distort such images.

It should be appreciated that camera 200 may include any suitable number, type, size, and configuration of camera(s) 200 for obtaining images of wash basket 70. In general, camera 200 may include a lens that is constructed from a clear hydrophobic material or which may otherwise be positioned behind a hydrophobic clear lens. So positioned, camera 200 may obtain one or more images or videos of wash basket 70, as described in more detail below. In some embodiments, washing machine appliance 50 may further include a tub light (not shown) that is positioned within cabinet 52 or wash chamber 73 for selectively illuminating wash chamber 73 and/or contents therein, such as wash basket 70.

Notably, controller 100 of washing machine appliance 50 (or any other suitable dedicated controller) may be communicatively coupled to camera 200 and other components of washing machine appliance 50. As explained in more detail below, controller 100 may be programmed or configured for obtaining images using camera 200, e.g., in order to detect certain operating conditions and improve the performance of washing machine appliance 50. In addition, controller 100 may be programmed or configured to perform methods to identify a structural similarity index (SSIM) value and to analyze the SSIM value between one or more images or videos of wash basket 70. Such analysis may be, for example, pixel-based, such as determining structural similarity based on a number of different pixels between one or more images or videos of wash basket 70, and examples of such SSIM value analysis will be described in more detail below with reference to various example embodiments.

Controller 100 may be generally configured to perform a series of steps in order to detect certain operating conditions and improve the performance of washing machine appliance 50. More particularly, controller 100 may be configured to perform a series of steps in order to detect malfunction of pump 90, such as the controller may be operable to determine whether the pump is operating as expected. Operating as expected may include providing at least a minimum drain rate, where draining more slowly than the minimum rate may be determined as the drain pump not operating as expected. For example, controller 100 may be generally configured to receive a command to, and/or commence, an operating cycle. The operating cycle may be or include a drain operation, such as a drain phase of an operating cycle. The command may include normal operation command, such as, pump 90 may be activated to drain liquid from the washing machine appliance 50 during the entire drain phase or during one or more portions of the spin cycle, or the command may be user manipulation of the user interface input. Thus, controller 100 may be configured to activate pump 90 whereby, when pump 90 is operating, such as operating as expected, the drain pump drains the wash liquid from the wash tub 64. For example, controller 100 may be generally configured to send, during the operating cycle, an activation command to pump 90 of washing machine appliance 50. Controller 100 may generally be further configured to obtain one or more images of wash basket 70, after sending the activation command, using the camera. The step of obtaining one or more images of the wash tub 64 may include taking multiple images of the wash basket over a specified time period, e.g., sixty seconds (60 s), after sending the activation command. For example, the one or more images may include an initial image, a first subsequent image, and a second subsequent image.

The controller may then be configured to analyze the one or more images of the wash basket 70. Analyzing the one or more images may generally include determining a first SSIM value for the first image and determining a second SSIM value for the second subsequent image, each image compared in view of the initial image. In other words, the SSIM values are determined by comparing each subsequent image to the initial image. The SSIM values represented as the Y axis of FIGS. 5 and 6, and the dots depicting each image's SSIM value. The controller may then determine whether pump 90 is operating as expected based on the analysis of the one or more images. For example, determining whether the drain pump is operating as expected may be based at least in part on the SSIM value decreasing between sequential images over the specified time period. In particular, determining whether the pump 90 is operating may include determining the pump 90 is operating based on the second SSIM value being less than the first SSIM value by at least a predetermined threshold amount, such as one-tenth (0.1) SSIM. Conversely, determining whether the pump 90 is operating may include determining the drain pump is not operating based on the second SSIM value within a predetermined threshold amount of the first SSIM value, such as one-hundredth (0.01) SSIM.

In additional or alternative example embodiments, controller 100 may be configured to provide a user notification when pump 90 is not operating as expected. The user notification may include one or more of audible tones, text messages, e-mails, and/or push notifications. Controller 100 may be further configured to reboot washing machine appliance 50 when pump 90 is determined to not be operating as expected. The user notification may also include a prompt or optional command the user may select to initiate the reboot of washing machine appliance 50.

Figure 5:
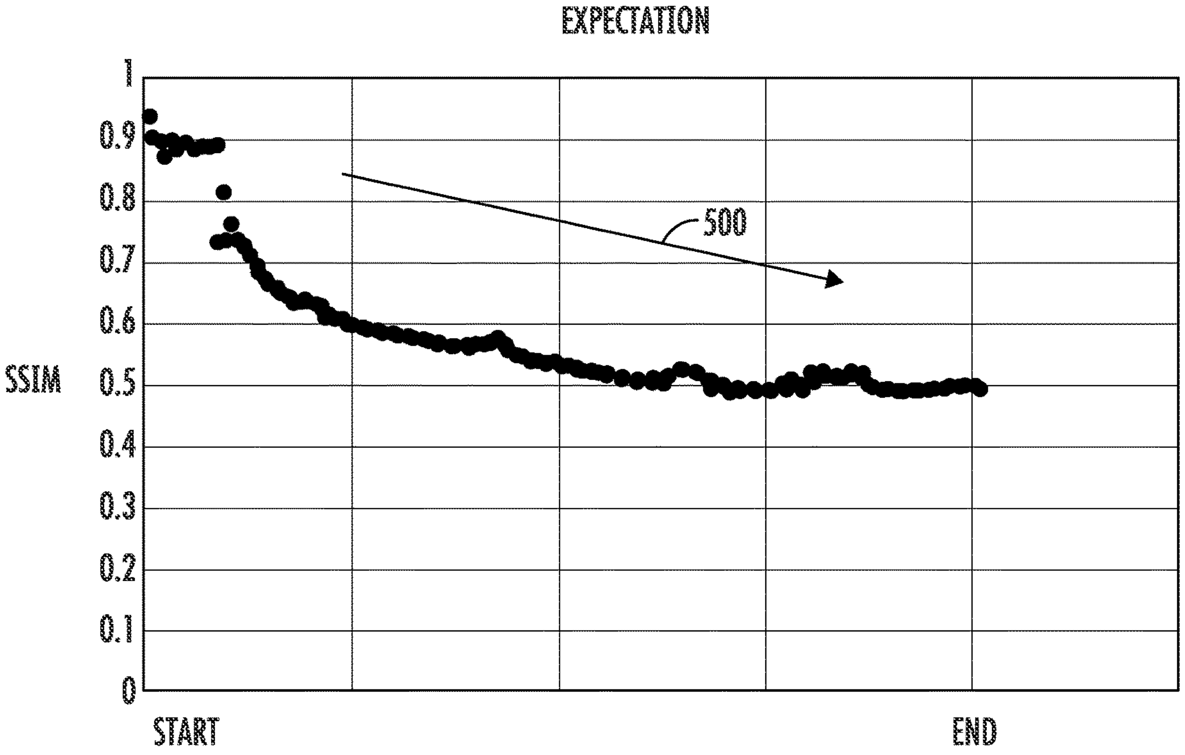
FIG. 5 provides a graphical representation of an example drain cycle of a washing machine appliance according to aspects of the present disclosure.
Figure 6:
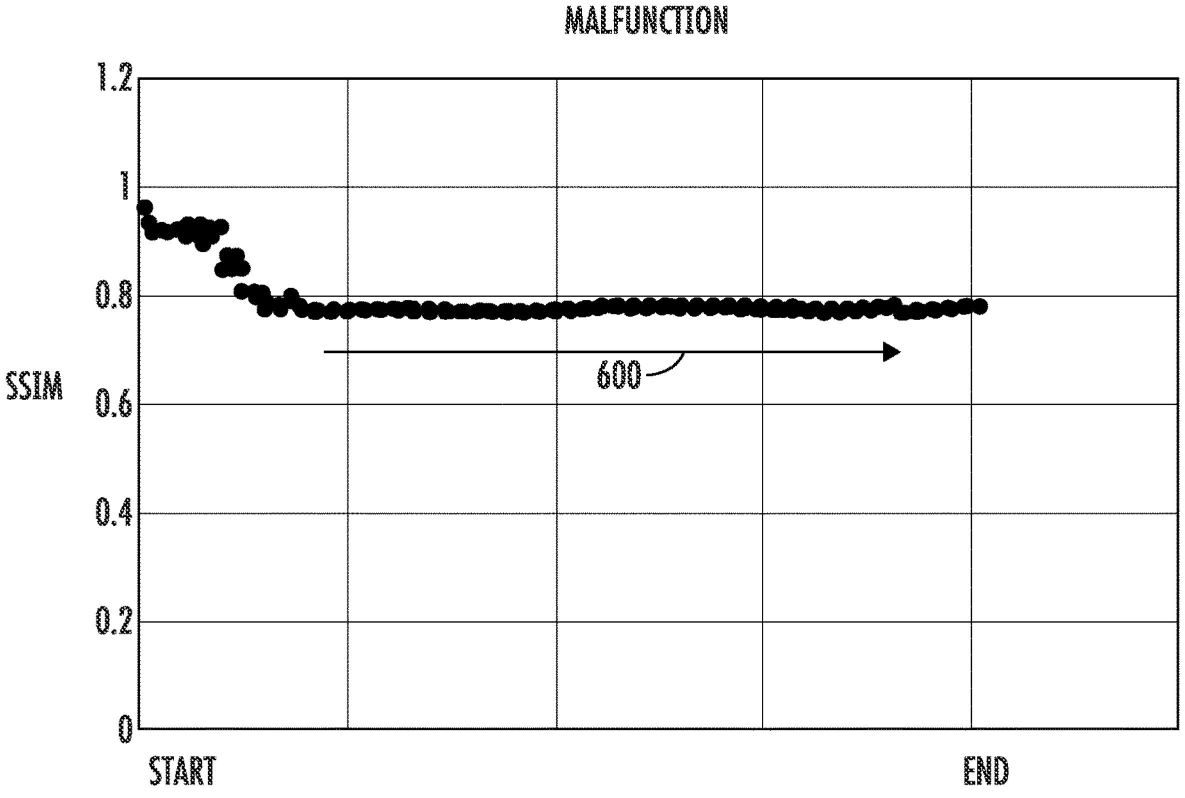
FIG. 6 provides a graphical representation of an example drain cycle malfunction of a washing machine appliance according to aspects of the present disclosure.

As illustrated in FIG. 5, when pump 90 operates as intended, the SSIM value will decrease as low as half (0.5), e.g., the SSIM value decreases, as shown by general trend line 500, as the load gets lower and the water level inside of wash tub 64 decreases. The SSIM values for a series of subsequent images (e.g., images obtained after the initial image) are generally depicted as dots from start to end along the X-axis, e.g., multiple images of wash basket 70 over the specified time period during the draining step. Each SSIM value indicates the pixel similarity of the corresponding subsequent image to the initial image. Making the images grayscale further advantageously increases the accuracy of the SSIM value of the subsequent images. When pump 90 does not operate as intended, e.g., as illustrated in FIG. 6, the subsequent images will remain similar to the initial image, resulting in SSIM values which change gradually (if at all) and which remain higher (as compared to the SSIM values when the drain pump is operating as expected, such as the exemplary SSIM values illustrated in FIG. 5, which, as noted above, may be as low as 0.5 SSIM), e.g., in the example of FIG. 6 where the drain pump is not operating as expected, the SSIM values remain around eight-tenths (0.8), as shown by general trend line 600. Thus, the determination of pump 90 malfunction, e.g., not operating as expected, may be based on the SSIM value not decreasing and maintaining the higher value.

Figure 7:
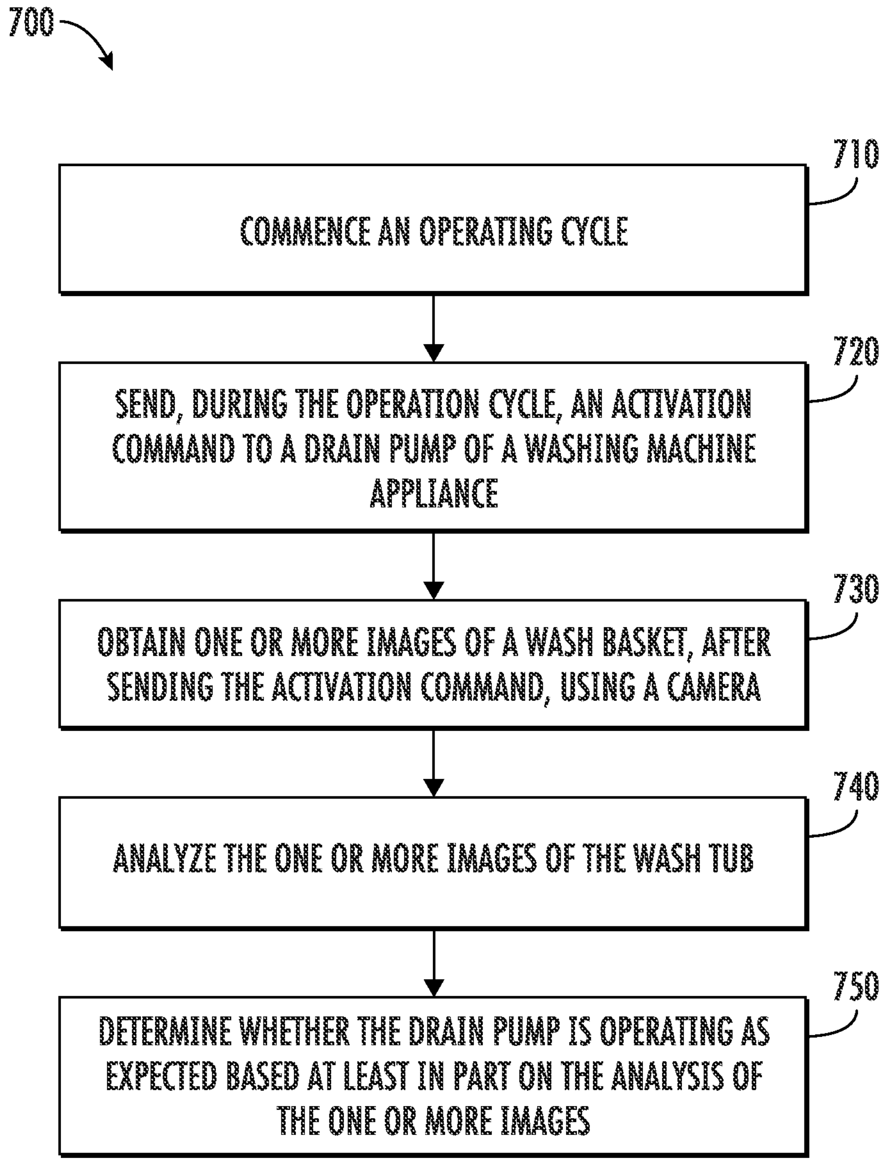
FIG. 7 provides a method of operating a washing machine appliance according to aspects of the present disclosure.

Referring now to FIG. 7, a flow diagram of one embodiment of a method 700 of operating a washing machine appliance is illustrated in accordance with aspects of the present subject matter. In general, method 700 will be described herein with reference to the embodiments of washing machine appliance 50 described above with reference to FIGS. 1-6. However, it should be appreciated by those of ordinary skill in the art that the disclosed method 700 may generally be utilized in association with apparatuses and systems having any other suitable configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (710), method 700 may generally include commencing an operating cycle. The operating cycle may be or include a drain operation, such as a drain phase of an operating cycle. At (720), method 700 may generally include sending, during the operating cycle, an activation command to a drain pump of the washing machine appliance. The activation command may include normal operation command, such as, pump 90 may be activated to drain liquid from the washing machine appliance 50 during the entire drain phase or during one or more portions of the spin cycle At (730), method 700 may generally include obtaining one or more images of the wash tub, after sending the activation command (720), using camera 200 mounted within the cabinet. The camera 200 may be positioned and oriented with wash basket 70 within a field of vision of the camera 200. At (740), method 700 may generally include analyzing the one or more images of the wash tub, and at (750) determining whether pump 90 is operating as expected based at least in part on the analysis (740) of the one or more images.

As may be seen from the above, a method of operating a washing machine appliance includes commencing an operating cycle and sending an activation signal to a drain pump. The method also includes obtaining one or more images of the wash tub, after sending the activation signal, using a camera mounted within the cabinet and analyzing the one or more images of the wash tub. Then, determining whether a drain pump is operating based at least in part on the analysis of the one or more images. The images may be grayscale to advantageously increases the accuracy of the SSIM value of the images. The method advantageously uses a camera and image processing in a washing machine appliance to determine malfunction of the drain pump.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a washing machine appliance, the washing machine appliance comprising a cabinet, a wash tub mounted within the cabinet and configured for containing fluid during operation of the washing machine appliance, and a wash basket rotatably mounted within the wash tub, the wash basket defining a wash chamber configured for receiving laundry articles, a spout configured for providing wash fluid to the wash tub, a camera mounted one of on or within the cabinet, the camera positioned and oriented with the wash basket within a field of vision of the camera, and a controller, the method comprising:

commencing, by the controller, an operating cycle;

sending, by the controller during the operating cycle, an activation command to a drain pump of the washing machine appliance, the drain pump configured to drain wash liquid from the wash tub;

obtaining, by the controller, one or more images of the wash tub, after sending the activation command, using the camera;

analyzing, by the controller, the one or more images of the wash tub; and determining, by the controller, whether the drain pump is operating as expected based at least in part on the analysis of the one or more images, wherein the drain pump operating as expected comprises draining wash liquid from the wash tub at or above a minimum drain rate, wherein the one or more images includes an initial image, a first subsequent image, and a second subsequent image, and wherein analyzing the one or more images comprises determining a first structural similarity index value for the first subsequent image and determining a second structural similarity index value for the second subsequent image.

2. The method of claim 1, further comprising providing a user notification when the drain pump is not operating as expected.

3. The method of claim 2, wherein the user notification comprises one or more of audible tones, text messages, e-mails, and push notifications.

4. The method of claim 1, further comprising rebooting the washing machine appliance when the drain pump is not operating as expected.

5. The method of claim 1, wherein determining whether the drain pump is operating as expected comprises determining the drain pump is operating as expected based on the second structural similarity index value less than the first structural similarity index value by at least a predetermined threshold amount.

6. The method of claim 1, wherein determining whether the drain pump is operating as expected comprises determining the drain pump is not operating as expected based on the second structural similarity index value within a predetermined threshold amount of the first structural similarity index value.

7. The method of claim 1, wherein the camera is mounted below a spout within the cabinet.

8. The method of claim 1, wherein the step of obtaining one or more images of the wash tub comprises taking multiple images of the wash basket over a specified time period after sending the activation command, and wherein determining whether the drain pump is operating as expected is based at least in part on a structural similarity index value decreasing between sequential images over the specified time period.

9. A washing machine appliance, comprising:

a cabinet;

a wash tub mounted within the cabinet and configured for containing fluid during operation of the washing machine appliance;

a wash basket rotatably mounted within the wash tub, the wash basket defining a wash chamber configured for receiving laundry articles;

a spout configured for providing wash fluid to the wash tub;

a camera mounted one of on or within the cabinet, the camera positioned and oriented with the wash basket within a field of vision of the camera; and a controller, the controller configured to:

commence an operating cycle;

send, during the operating cycle, an activation command to a drain pump of the washing machine appliance, the drain pump configured to drain wash liquid from the wash tub;

obtain one or more images of the wash tub, after sending the activation command, using the camera;

analyze the one or more images of the wash tub; and determine whether the drain pump is operating as expected based at least in part on the analysis of the one or more images, wherein the drain pump operating as expected comprises draining wash liquid from the wash tub at or above a minimum drain rate, wherein the one or more images includes an initial image, a first subsequent image, and a second subsequent image, and wherein the analysis of the one or more images comprises the controller configured to determine a first structural similarity index value for the first subsequent image and determine a second structural similarity index value for the second subsequent image.

10. The washing machine appliance of claim 9, wherein the controller is further configured to provide a user notification when the drain pump is not operating as expected.

11. The washing machine appliance of claim 10, wherein the user notification comprises one or more of audible tones, text messages, e-mails, and push notifications.

12. The washing machine appliance of claim 9, wherein the controller is further configured to reboot the washing machine appliance in response to the drain pump not operating as expected.

13. The washing machine appliance of claim 9, wherein determining whether the drain pump is operating as expected comprises the controller configured to determine the drain pump is operating as expected based on the second structural similarity index value less than the first structural similarity index value by at least a predetermined threshold amount.

14. The washing machine appliance of claim 13, wherein determining whether the drain pump is operating as expected comprises the controller configured to determine the drain pump is not operating as expected based on the second structural similarity index value within a predetermined threshold amount of the first structural similarity index value.

15. The washing machine appliance of claim 9, wherein the camera is mounted one of below the spout within the cabinet, and on a lid of the washing machine appliance.

16. The washing machine appliance of claim 9, wherein the step of obtaining one or more images of the wash tub comprises taking multiple images of the wash basket over a specified time period after sending the activation command, and wherein determining whether the drain pump is operating as expected is based at least in part on a structural similarity index value decreasing between sequential images over the specified time period.

17. A washing machine appliance, comprising:

a cabinet;

a wash tub mounted within the cabinet and configured for containing fluid during operation of the washing machine appliance;

a wash basket rotatably mounted within the wash tub, the wash basket defining a wash chamber configured for receiving laundry articles;

a spout configured for providing wash fluid to the wash tub;

a camera mounted one of on or within the cabinet, the camera positioned and oriented with the wash basket within a field of vision of the camera; and a controller, the controller configured to:

commence an operating cycle;

send, during the operating cycle, an activation command to a drain pump of the washing machine appliance, the drain pump configured to drain wash liquid from the wash tub;

obtain one or more images of the wash tub, after sending the activation command, using the camera;

analyze the one or more images of the wash tub; and determine whether the drain pump is operating as expected based at least in part on the analysis of the one or more images, wherein the drain pump operating as expected comprises draining wash liquid from the wash tub at or above a minimum drain rate, wherein the step of obtaining one or more images of the wash tub comprises taking multiple images of the wash basket over a specified time period after sending the activation command, and wherein determining whether the drain pump is operating as expected is based at least in part on a structural similarity index value decreasing between sequential images over the specified time period.

18. The washing machine appliance of claim 17, wherein the controller is further configured to provide a user notification when the drain pump is not operating as expected.

19. The washing machine appliance of claim 18, wherein the user notification comprises one or more of audible tones, text messages, e-mails, and push notifications.

20. The washing machine appliance of claim 17, wherein the controller is further configured to reboot the washing machine appliance in response to the drain pump not operating as expected.

* * * * *